Patented June 10, 1930

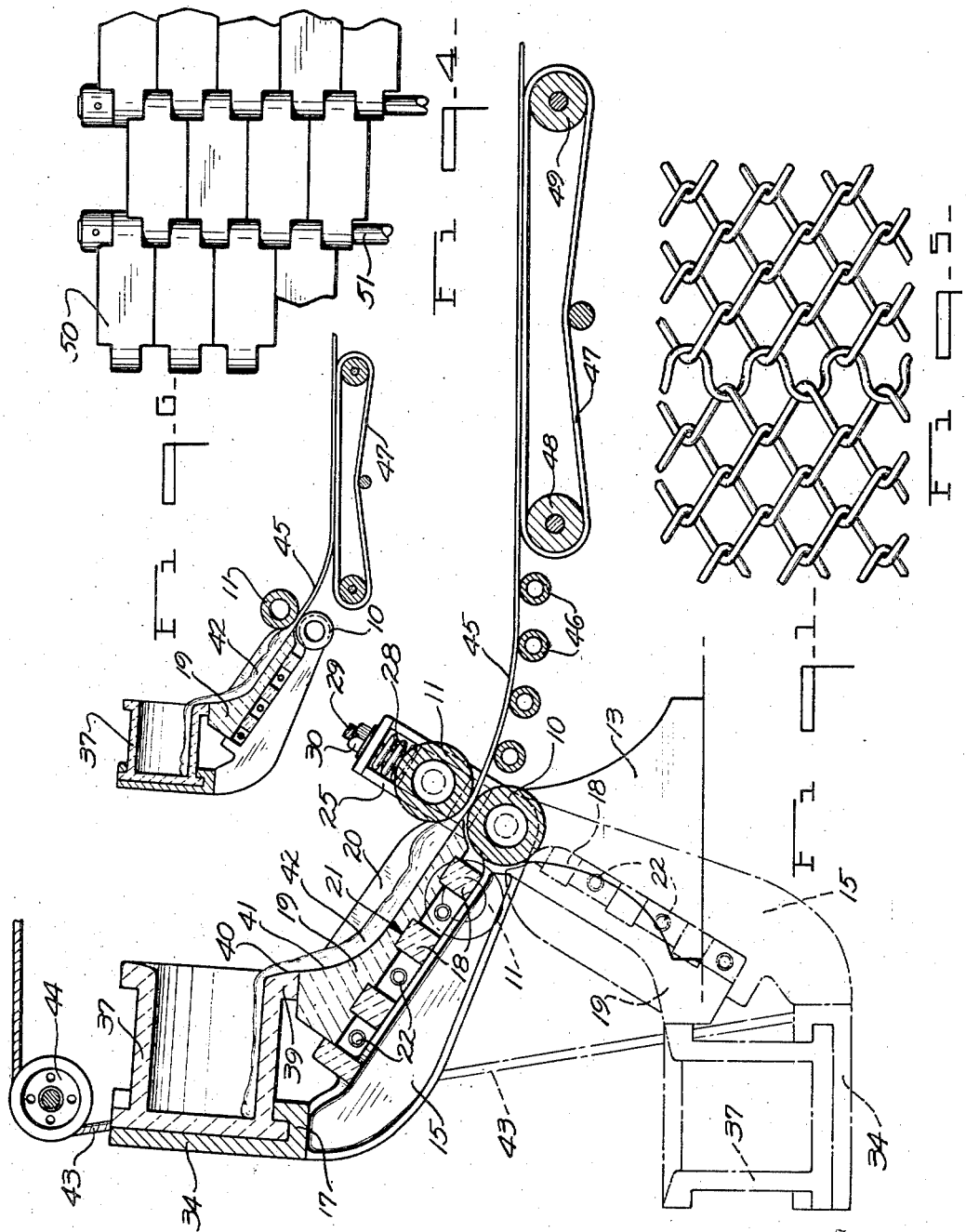

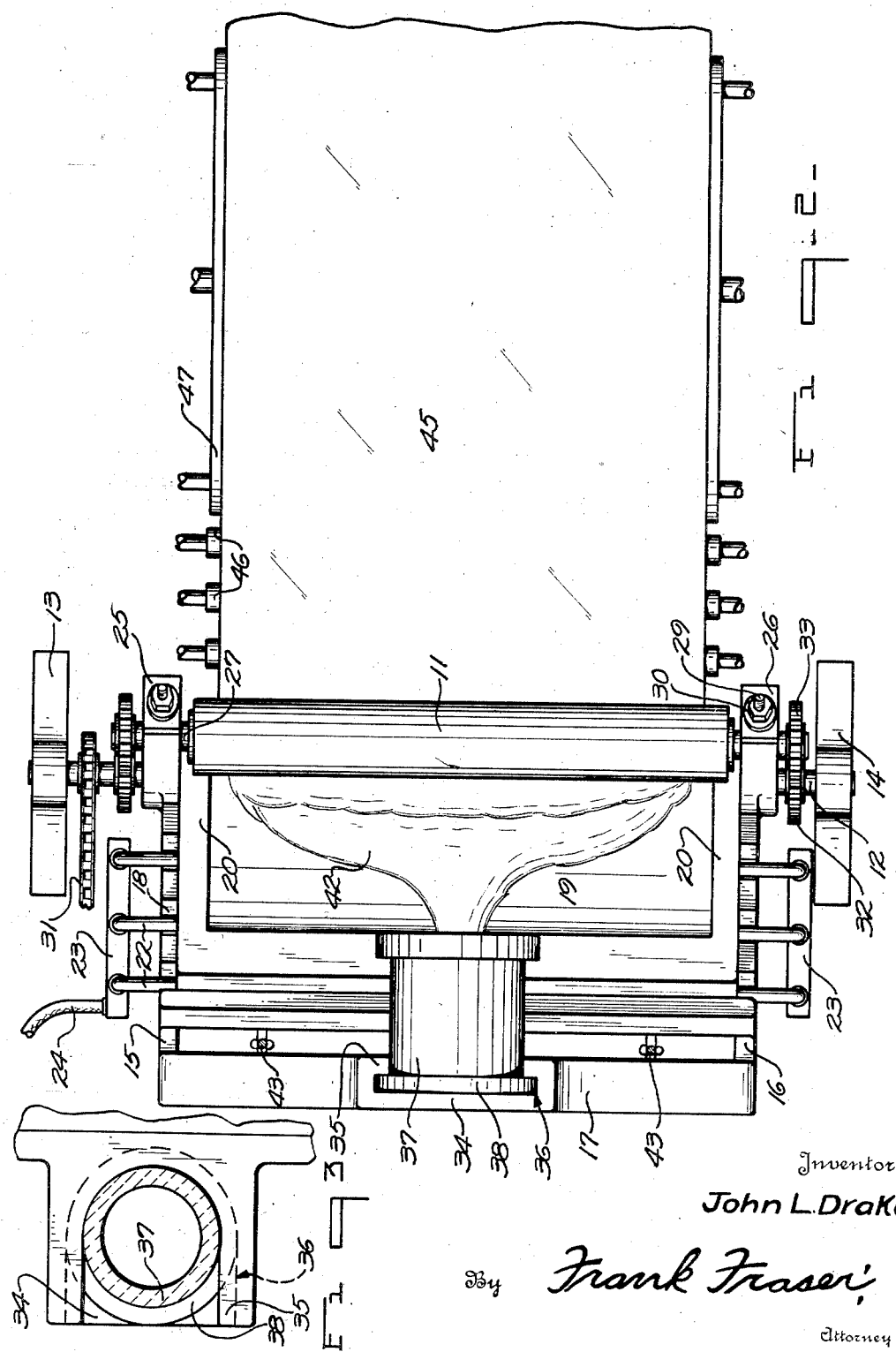

1,762,508

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

APPARATUS FOR PRODUCING SHEET GLASS

Application filed October 24, 1928. Serial No. 314,562.

This invention relates to improvements in apparatus for forming sheet glass by an intermittent rolling operation and especially concerns the manner in which the molten glass is transferred from the receptacle or pot within which it is melted and/or refined to the rolling mechanism by which it is reduced to sheet form.

It is well known to those skilled in the art of glass making that according to one method of manufacturing large glass sheets or plates by rolling, the receptacle or pot filled with molten glass is lifted bodily from its seat in the melting furnace and carried to the working place, there to be overturned in order to pour all of the molten glass contained therein onto a receiving table or support from where it is moved to the sheet forming rolls or other forming mechanism. Ordinarily, the pot is lifted above the receiving table or support and tilted so that the glass is flowed from the pot onto the support in such a manner that it will fall or drop a considerable distance. By dropping the glass onto the receiving table in this way, the mass of molten glass which, until then, was comparatively homogeneous and free of streaks and bubbles will be drawn out, torn and agitated and the several superposed layers of glass in the pot will be displaced relative to one another with the result that the quality of the glass will be greatly impaired. Therefore, a sheet or plate obtained by rolling out this glass will, as a rule, be defective inasmuch as streaks, air bubbles or other flaws are formed and foreign matter is admixed in the plastic glass. Furthermore, the entire content of the pot is usually poured or deposited upon the receiving table before any of the glass is moved to the forming mechanism as a consequence of which the molten glass rests upon the receiving table for a length of time sufficient to cause an undue chilling of the glass in contact therewith, the receiving table tending to rapidly absorb heat therefrom. This is likewise an undesirable condition.

One of the objects of the present invention is to so improve the handling of the molten glass as it is transferred from the furnace t the rolling mechanism that its homogeneity will not be impaired and as a consequence of which the rolling of glass of high quality relatively free from streaks, bubbles and other flaws may be achieved.

Another object of the invention is the provision of means for transferring the molten glass from the pot or receptacle within which it is melted and/or refined to the sheet rolling mechanism in such a manner that the glass will flow from the former to the latter in an unbroken and undisturbed stream without any fall or drop so that the homogeneity of the glass will not be impaired during such transfer to the end that a sheet of improved quality may be produced.

A further object of the invention resides in the provision of means for transferring the molten glass from the receptacle or pot to the rolling mechanism in such a manner that the glass will be kept in motion and will not contact with or lay idle upon the receiving table or support or upon any other surface which would tend to rapidly absorb heat from the glass and chill the same.

Other objects and advantages of the invention will become more apparent during the course of the following description when taken in connection with the accompanying drawings.

In the drawings forming a part of this application and wherein like numerals are employed to designate like parts throughout the same—

Fig. 1 is a longitudinal vertical section through glass forming apparatus provided by the present invention.

Fig. 2 is a top plan view thereof.

Fig. 3 is a detail view showing the manner of retaining the receptacle or pot in position during the emptying thereof.

Figs. 4 and 5 are plan views showing two different types of conveyors which may be used for supporting the glass sheets, and Fig. 6 is a view somewhat similar to Fig. 1 but showing an alternate arrangement.

Referring to the drawings, 10 and 11 designate two sheet forming rolls associated with one another in a manner to create a sheet forming pass therebetween, the width of which determines the thickness of sheet produced. The lower forming roll 10 is carried upon a shaft 12 journaled at its opposite ends in standards 13 and 14. The numerals 15 and 16 designate a pair of spaced arms loosely mounted at their inner or forward ends upon the shaft 12 of roll 10 and being connected at their outer or rear ends by a cross piece 17. Extending between and secured to the arms 15 and 16 are a plurality of spaced preferably refractory supporting members or slabs 18 which support thereupon the refractory receiver of support 19 for the molten glass, said receiver being provided with upstanding side portions 20 to confine the molten glass thereon. The bottom surface of the receiver 19 may be provided with a plurality of grooves 21 within which may be received the upper portions of the supporting member 18 whereby said receiver may be held in position.

Located beneath the receiver 19 between adjacent supporting members 18 are burners or other heating elements 22 which function to maintain the receiver at the desired temperature and so control the temperature of the molten glass thereon to prevent chilling of the glass in contact therewith. In the event gas burners are employed, the burner pipes 22 may connect at either end with a manifold or header 23 and from one of which may extend a flexible connection 24 to a suitable source of supply. The burner pipes or other heating elements are adapted to be movable with the receiver 19.

The forward ends of the arms 15 and 16 are provided with or carry bracket members 25 and 26 which extend at substantially right-angles with respect thereto and within which are journaled the opposite ends of shaft 27 carrying the upper forming roll 11. The upper forming roll is yieldably urged toward the lower forming roll by means of compression springs 28 while the movement of the upper roll toward the lower roll is limited by bolts 29 and nuts 30. The lower forming roll 10 is adapted to be positively driven such as through a sprocket and chain connection 31 associated with shaft 12, while the upper forming roll 11 is adapted to be driven from roll 10 through the intermeshing gears 32 and 33, the forming rolls being driven in opposite directions to advance the molten glass therebetween.

The cross piece 17, connecting arms 15 and 16, is preferably provided intermediate its ends with a socket portion or the like for removably holding the receptacle or pot containing the molten glass. This socket portion herein comprises a base plate 34 provided with an inwardly directed substantially U-shaped flange 35 spaced therefrom and cooperating therewith to form a channel 36. The numeral 37 designates the receptacle or pot for the molten glass and which pot is provided at the bottom thereof with an annular flange 38 adapted to be received within the channel 36 when the pot is placed in position. The open or mouth end of the pot is also provided with an annular flange 39 adapted to contact with the adjacent end of the receiver 19. The surface 40 of flange 39 is preferably curved as shown and is contiguous to surface 41 of the receiver 19 so that there will be presented a continuous unbroken surface over which the molten glass flows from the pot to the forming rolls. The shape and construction of the pot may be varied as desired and the holding means therefore modified accordingly.

In the operation of the apparatus above described, the supporting arms 15 and 16 are first lowered to the position indicated by the broken lines in Fig. 1 so that the base plate 34 of the socket portion will be disposed in a substantially horizontal position. When the arms are thus lowered, the upper forming roll 11 will assume the position indicated by the broken lines in Fig. 1. The pot 37 containing a mass of completely melted and refined molten glass is then lifted from its seat in the melting furnace and placed upon the base plate 34 in a manner that the flange 38 thereof is received within the channel 36. The arms 15 and 16 are then adapted to be raised and when this is done the said arms, pot 37, receiver 19 and forming roll 11 will be swung upwardly about the axis of rotation of the lower forming roll 10. As the pot and receiver are swung upwardly, the pot will be gradually tilted so that the molten glass will flow therefrom more in stream form as indicated at 42 downwardly over the receiving table or support 19 to the sheet forming rolls. The lifting and tilting of the pot is adapted to be slow and gradual so that the molten glass will flow therefrom down the receiver to the forming rolls easily and gently in a smooth undisturbed stream and without any fall or drop. By controlling the speed of tilting of the pot, the glass can be flowed from the pot slowly and in a relatively thin stream so that the glass will tend to flow rather than fall along the receiver to the forming rolls. By flowing the glass from the pot to the forming rolls in this manner, the homogeneity of the molten glass will not be disturbed so that the sheet or plate formed therefrom will be of a high quality relatively free from streaks, bubbles and other flaws. Also, by properly regulating the flow of glass from the pot, the glass can be reduced to sheet form substantially as rapidly as it is supplied to the forming rolls. Thus, the glass will be kept in motion and will not contact with or lay idle upon the receiving table for any considerable length of time. The heating elements 22 will maintain the receiver at the desired temperature so that the molten glass contacting therewith will not be chilled thereby. The raising and tilting of the pot may be accomplished by any desired lifting means and for the purposes of illustration there is herein shown a pair of cables 43 secured to the cross piece 17 and trained about drums or pulleys 44.

As the molten glass 42 is advanced between the forming rolls 10 and 11, it is reduced thereby to a sheet 45 of substantially predetermined and uniform thickness. The sheet 45 issuing from the sheet forming pass is supported and carried along first upon a plurality of spaced rolls 46 and then upon an endless conveyor or the like 47 to an annealing leer. Any desired means for and manner of carrying the glass sheet forwardly away from the rolling mechanism may of course, be employed and the present invention is not to be restricted to the apparatus shown for accomplishing this purpose. For example, the endless conveyor 47 may be of solid band construction trained about drums or the like 48 and 49. On the other hand, the conveyor may be of the form illustrated in Fig. 4 which comprises a plurality of interengaging links 50 mounted upon continuous cross shafts 51, said links being associated with one another in a manner that the conveyor will present a substantially solid unbroken surface for supporting the glass sheet thereon. Further, the conveyor may be of a wire mesh or screen formation as illustrated in Fig. 5. Also, instead of passing the sheet first onto rolls 46 and then onto the conveyor 47, the said sheet may be passed directly from the rolling mechanism onto the endless conveyor as disclosed in Fig. 6.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for producing sheet glass, sheet rolling mechanism, means for supplying molten glass thereto including a receptacle adapted to contain the molten glass and a member for receiving the glass from the receptacle and guiding it to the rolling mechanism, and means for simultaneously moving the receptacle and member so that the glass will flow from said receptacle to said rolling mechanism without any fall or drop.

2. In apparatus for producing sheet glass, sheet rolling mechanism, means for supplying molten glass thereto including a receptacle adapted to contain the molten glass and a member for receiving the glass from the receptacle and guiding it to the rolling mechanism, and means for simultaneously moving the receptatcle and member so that the glass will flow from said receptacle to said rolling mechanism in continuous uninterrupted stream form.

3. In apparatus for producing sheet glass, sheet rolling mechanism, means for supplying molten glass thereto including a receptacle adapted to contain the molten glass and a member for receiving the glass from the receptacle and guiding it to the rolling mechanism, means for simultaneously moving the receptacle and member so that the glass will flow from said receptacle to said rolling mechanism in continuous uninterrupted stream form, and means for controlling the temperature of the glass upon said member.

4. In apparatus for producing sheet glass, sheet rolling mechanism, means for supplying molten glass thereto including a receptacle adapted to contain the molten glass and a member for receiving the glass from the receptacle and guiding it to the rolling mechanism, means for simultaneously moving the receptacle and member so that the glass will flow in uninterrupted stream form and without any fall or drop from said receptacle to said rolling mechanism, and means for heating said member from beneath.

5. In apparatus for producing sheet glass, sheet rolling mechanism, means for supplying molten glass thereto including a receptacle adapted to contain the molten glass and a member for receiving the glass from the receptacle and guiding it to the rolling mechanism, and means for moving the receptacle and member as a unit to cause the glass to flow from said receptacle over said member to said rolling mechanism.

6. In apparatus for producing sheet glass, sheet rolling mechanism, means for supplying molten glass thereto including a receptacle adapted to contain the molten glass and a member for receiving the glass from the receptacle and guiding it to the rolling mechanism, means for moving the receptacle and member as a unit to cause the glass to flow from said receptacle over said member to said rolling mechanism, and means for controlling the temperature of said member to control the temperature of the molten glass thereon.

7. In apparatus for producing sheet glass, a pair of sheet forming rolls, means for supplying molten glass thereto including a receptacle adapted to contain the molten glass and a member for receiving the glass from the receptacle and guiding it to the forming rolls, and means for moving the receptacle and member as a unit about the axis of rotation of one of said forming rolls whereby to cause the molten glass to flow from said receptacle over said member to said forming rolls.

8. In apparatus for producing sheet glass, a pair of sheet forming rolls, means for supplying molten glass thereto including a receptacle adapted to contain the molten glass and a member for receiving the glass from the receptacle and guiding it to the forming rolls, means for moving the receptacle and member as a unit about the axis of rotation of one of said forming rolls whereby to cause the molten glass to flow from said receptacle over said member to said forming rolls, and heating means movable with said member for heating the same.

9. In apparatus for the production of sheet glass, upper and lower forming rolls spaced from one another to create a sheet forming pass therebetween, means for supplying molten glass to said pass including a receptacle adapted to contain the molten glass and a member for receiving the glass from the receptacle and guiding it to said pass, said receptacle being initially disposed in a horizontal position and the member in an upwardly inclined position, and means for swinging the receptacle and member upwardly as a unit about the axis of rotation of the lower forming roll so that the glass will flow from said receptacle downwardly over said member to the sheet forming pass.

10. In apparatus for the production of sheet glass, upper and lower forming rolls spaced from one another to create a sheet forming pass therebetween, means for supplying molten glass to said pass including a receptacle adapted to contain the molten glass and a member for receiving the glass from the receptacle and guiding it to said pass, said receptacle being initially disposed in a horizontal position and the member in an upwardly inclined position, means for swinging the receptacle and member upwardly as a unit about the axis of rotation of the lower forming roll so that the glass will flow from said receptacle downwardly over said member to the sheet forming pass, and heating means positioned beneath said member and movable therewith to control the temperature thereof and likewise the temperature of the molten glass thereon.

11. In apparatus for the production of sheet glass, a pair of sheet forming rolls, means for supplying molten glass to the rolls including supporting means carried by one of said rolls, a guide member and a receptacle carried by said supporting means, said receptacle being adapted to contain molten glass, and means for moving said supporting means about the axis of rotation of the roll carrying the same so as to raise the receptacle and guide member as a unit whereby the molten glass will flow from said receptacle over said member to said forming rolls.

12. In apparatus for the production of sheet glass, a pair of sheet forming rolls, means for supplying molten glass to the rolls including supporting means carried by one of said rolls, a guide member and a receptacle carried by said supporting means, said receptacle being adapted to contain molten glass, means for moving said supporting means about the axis of rotation of the roll carrying the same so as to raise the receptacle and guide member as a unit whereby the molten glass will flow from said receptacle over said member to said forming rolls, and heating elements positioned beneath the guide member and movable therewith.

13. In apparatus for the production of sheet glass, a sheet forming roll, supporting means loosely mounted upon said roll, a receptacle containing molten glass removably carried by said supporting means, a directing member carried by the supporting means between the receptacle and roll for receiving the molten glass from the former and guiding it to the latter, means for swinging the supporting means, receptacle and directing member as a unit about the axis of rotation of the forming roll, and a second sheet forming roll cooperating with the first named forming roll to reduce the glass to sheet form.

14. In apparatus for the production of sheet glass, a sheet forming roll, supporting means loosely mounted upon said roll and including a socket portion, a receptacle adapted to contain molten glass removably carried by said socket portion, a directing member positioned between the receptacle and roll and adapted to receive the molten glass from the former and direct it to the latter, said receptacle being initially disposed in a horizontal position and the directing member in an upwardly inclined position, means for swinging the supporting means, receptacle and directing member upwardly about the axis of rotation of the forming roll to cause the molten glass to flow in stream form from the receptacle downwardly over the directing member to the forming roll, and a second forming roll cooperating with the first named forming roll to reduce the molten glass to sheet form.

15. In apparatus for the production of sheet glass, a sheet forming roll, supporting means loosely carried by said roll, a receptacle and a guide member carried by the supporting means, said receptacle being adapted to contain molten glass and the guide member being adapted to receive the molten glass from said receptacle and direct it to the forming roll, a second sheet forming roll also carried by the supporting means and cooperating with the first named forming roll to reduce the molten glass to sheet form, and means for moving said supporting means to swing the receptacle, guide member and second forming roll as a unit about the axis of rotation of the first forming roll.

Signed at Toledo, in the county of Lucas and State of Ohio, this 20th day of October, 1928.

JOHN L. DRAKE.